June 30, 1959  J. T. HOWES ET AL  2,892,664
MOTOR BEARING ASSEMBLY
Filed Sept. 23, 1954
2 Sheets-Sheet 1

INVENTORS
JOHN T. HOWES
THOMAS W. STONE
BY
*James and Franklin*
ATTORNEYS

June 30, 1959

J. T. HOWES ET AL 2,892,664

MOTOR BEARING ASSEMBLY

Filed Sept. 23, 1954

INVENTOR.
JOHN T. HOWES
THOMAS W. STONE
BY

*James and Franklin*

ATTORNEYS

United States Patent Office 2,892,664
Patented June 30, 1959

2,892,664

MOTOR BEARING ASSEMBLY

John T. Howes and Thomas W. Stone, Owosso, Mich., assignors, by mesne assignments, to Controls Company of America, Schiller Park, Ill., a corporation of Delaware Application September 23, 1954, Serial No. 457,944

10 Claims. (Cl. 308—132)

The present invention relates to an assembly for rotatably mounting a shaft, and in particular to such as assembly in which novel means are provided for lubricating the thrust bearing interface. The invention is here specifically disclosed as incorporated in a fractional horsepower electric motor, it being particularly well adapted for use therewith, but its applicability is not limited thereto.

When a shaft is mounted within a bearing two problems must be met. The shaft must be supported in a plane perpendicular thereto without materially inhibiting its rotative ability and it must also be supported so as to have only a limited degree of movement in its axial direction. One type of shaft support which is very extensively employed is of the sleeve type, the shaft being received rotatably within an opening in the sleeve, the rotary interface between the sleeve and the shaft being lubricated in some appropriate manner so as to minimize wear and facilitate shaft rotatability. It is customary in arrangements of this nature to limit the axial movement of the shaft toward the sleeve by providing the shaft with a surface facing toward the sleeve and adapted to engage with some surface fixed with respect to the sleeve. The thrust bearing interface thus defined must also be lubricated, and various more or less complex and expensive arrangements have been devised for that purpose.

Because the sleeve bearing must usually be formed of special material, and because it is desirable economically and functionally that the support for that bearing, for example, the end plate of an electric motor, be formed of some other material more conventional in structural applications, the sleeve-like bearing is usually formed separate from the bearing support. Since no two individual bearing sleeves can, in a manufacturing operation, be relied upon to be assembled with their corresponding supports in exactly the same manner, and since those bearing sleeves often themselves define the elements which take up the axial thrust and limit the axial movement of the shaft, accurate control of axial shaft movement became a fairly serious manufacturing problem, requiring special and time consuming fabrication steps. In addition, the lubrication schemes themselves usually left much to be desired in the way of positiveness and reliability.

The bearing assembly structure of the present invention has proved to be eminently superior to those known in the prior art because it avoids the problems set forth above. It provides for simple and positive feed of lubricating fluid by wiping action to the thrust bearing interface as well as to the normal rotary bearing interface between the shaft and the bearing. In so doing it eliminates several parts heretofore deemed necessary in order to provide for adequate lubrication of the thrust bearing interface. This is significant not only because of the savings due to the cost of these eliminated parts, but also because of the savings incident upon the elimination of the assembly steps previously necessary in order to put those parts into place.

Moreover, the structure of the present invention permits the thrust bearing surface carried by the support to be formed directly on the support, whether or not a separate bearing sleeve of special material is employed. The assembly of such a bearing sleeve with the support is non-critical and does not modify the position of the thrust bearing surface on the support. Consequently that thrust bearing surface may if desired be accurately machined in the support during the formation thereof. In this way the thrust bearing surfaces in the aforementioned machine are quite accurately located, and this without requiring any special operations to be performed or adjustments to be made upon assembly of the machine. Moreover, provision is made to lubricate both the thrust and rotary bearings no matter in what position the motor may be operated without having to utilize grooves in the shaft journals.

The above results are achieved by providing a hub on the inner surface of the support within which the shaft is adapted to be rotatably received. A sleeve or bushing may be inserted between the hub and the shaft if desired. The thrust bearing surface is formed on the inner projecting end of the hub so that it will be engaged by a surface on the shaft or on an element carried by the shaft, thereby limiting axial movement of the shaft towards the hub. The hub, and optionally the bearing bushing if employed, is provided with a slot opening onto the inner end surface thereof (the thrust bearing surface, at least in the case of the hub) and extending outwardly therefrom. Absorbent material, preferably having a wick-like characteristic, is mounted within the slot and extends to the thrust bearing surface. Means are provided for supplying lubricating fluid to the absorbent material. Hence the lubricating fluid, through the action of the absorbent material, is led directly to the thrust bearing interface, and whenever the thrust surface on the shaft engages the thrust surface on the bearing lubricating fluid will be wiped from the absorbent material by the shaft and thus be positively and effectively interposed between the thrust surfaces. The lubrication is so effective that although the hub may be formed of normal constructional material such as aluminum, rather than special bearing material, no appreciable wear or deterioration of the thrust bearing surfaces will occur provided that the motor is adequately lubricated. It is preferred to utilize the same mass of absorbent material to provide lubrication to the rotary bearing interface and to that end the slot in the hub (and bearing bushing if employed) also opens onto an extends between the radially inner and outer surfaces of the hub (and bushing), a portion of the shaft wiping lubricating fluid from the absorbent material and thus lubricating the rotary bearing interface. A space is provided in which lubricant which escapes from the bearings will collect, and wick means are provided for returning that lubricant to the absorbent material in contact with the bearings.

To the accomplishment of the above, and to such other objects as may hereinafter appear, the present invention relates to the construction of a shaft bearing assembly as defined in the following claims and as described in this specification, taken together with the accompanying drawings in which:

Figure 1:
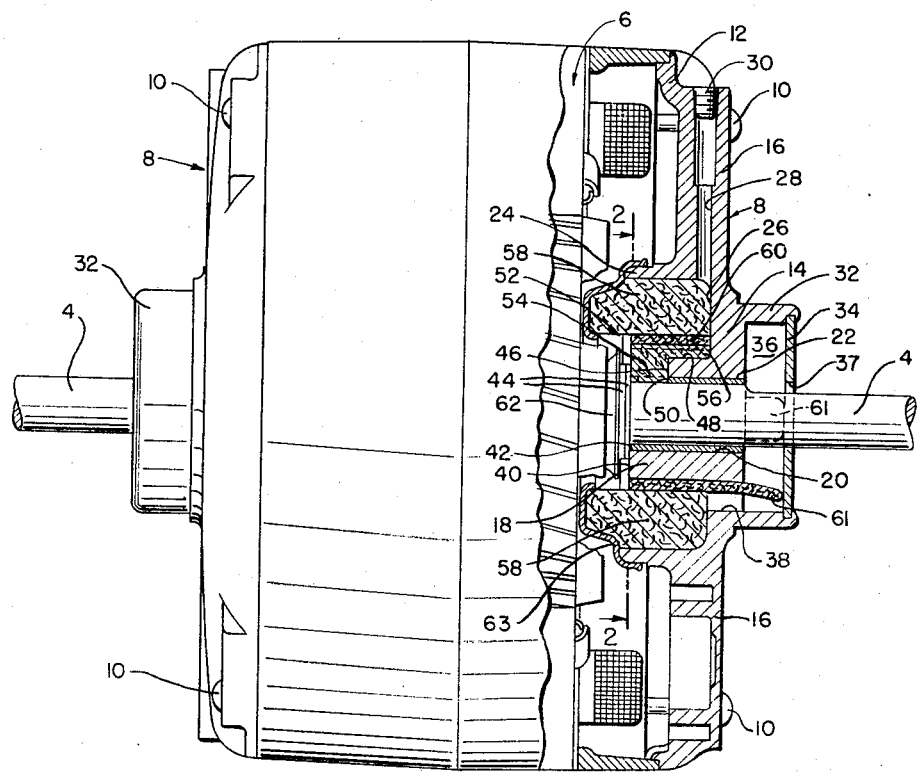
Fig. 1 is a side elevational view partially broken away and cross sectioned, of a fractional horsepower electric motor in which the present invention is incorporated.
Figure 2:
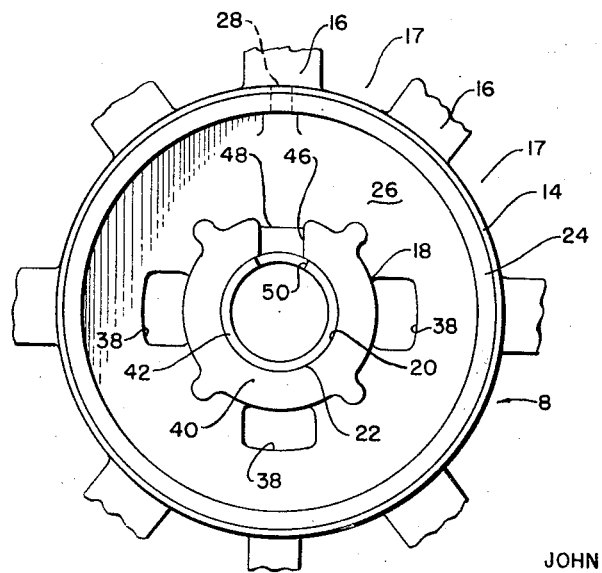
Fig. 2 is a fragmentary elevational view, taken along the line 2—2 of Fig. 1, showing the central portion of the motor end plate with the bearing positioned in place but with the absorbent material removed for clarity of illustration.

The electric motor in connection with which the present invention is illustrated comprises, as is customary, a rotor generally designated 2 mounted on a shaft 4 and adapted to rotate within a stator field assembly 6. End plates 8 are secured to opposite ends of the field structure 6 and are held in place by means of through bolts 10. One or more of the ends of the shaft 4 passes through the corresponding end plate 8, and each end plate 8 serves as the support for a bearing within which the shaft 4 is rotatably supported.

The end plate 8 is formed of some suitable structural material such as steel or aluminum. It is defined by a radially outer section 12 and a radially inner section 14 connected by arms 16, the arms having spaces 17 therebetween for ventilation purposes.

The radially inner portion 14 of the end plate 8 is provided with a hub 18 extending inwardly from the inner surface thereof for an appreciable distance, that hub having a central opening 20 preferably of circular cross section within which a portion of the shaft 4 is rotatably received. Since the structural material of which the end plate 8 is formed is usually not optimum for a bearing surface, it is generally deemed necessary to insert within the opening 20 a bushing or sleeve 22 of appropriate bearing material such as Babbitt metal, the bushing 22 being a press fit within the opening 20 and the internal dimension of the bushing 22 corresponding to the external dimension of that portion of the shaft 4 adapted to be received therewithin.

The end plate 8 is also provided with a wall 24 which surrounds and is spaced from the hub 18, defining an annular space 26 therebetween. One of the arms 16 of the end plate 8 is provided with a passage 28 communicating between the space 26 and the exterior of the end plate 8, that passage being closed by a removable screw or plug 30. The radially inner portion 14 of the end plate 8 may also be provided with a second wall 32 extending outwardly therefrom, a cover 34 being secured to the outer end of the wall 32 so as to substantially enclose the space 36 therewithin. If the shaft 4 is to extend out beyond the cover 34, the latter may be appropriately apertured, as at 37. The end plate 8 is provided with passages 38 communicating between the spaces 26 and 36 on opposite sides thereof.

The inner end surface 40 of the hub 18 is machined flat and perpendicular to the bore of the aperture 20. That surface 40 defines, either alone or together with the inner end surface 42 of the bearing bushing 22, the fixed thrust bearing surface, against which the axially outermost of the washers 44 carried by the shaft 4 are adapted to engage. Those washers, as is conventional, may be formed alternately of steel and cork, the outermost washer 44 being formed of steel. In order that the bearing bushing 22 should not interfere with the engagement between the axially outermost shaft-carried washer 44 and the axially inner hub surface 40, care must be taken that the axially inner end 42 of the bearing bushing 22 does not extend inwardly beyond the hub surface 40. The bushing surface 42 may be, and preferably is, flush with the surface 40, or it may be disposed axially outwardly with respect thereto, recessed within the hub 18, but it should not be disposed axially inwardly thereof so as to project therebeyond. Where a flush relationship between surfaces 40 and 42 is desired, both surfaces may be machined simultaneously after the bushing 22 has been inserted into place. If the inner bushing end surface 42 is to be recessed within the hub 18, then the hub surface 40 may be machined prior to insertion of the bushing 22.

The inner end of the hub 18 is provided with a slot 46. This slot opens onto and extends outwardly from the inner hub surface 40 and also extends between and opens onto the radially inner and outer surfaces of the hub 18. As here disclosed the radially through slot 46 communicates with a second slot portion 48 of reduced depth which opens onto the radially outer surface of the hub 18 but only extends partway through the hub toward the radially inner surface thereof. The bearing bushing 22, when employed, is provided with a slot 50 opening onto and extending between the radially inner and outer surfaces thereof and adapted to register, when the bushing 22 is inserted into the hub 18, with at least a portion of the hub slot 46. In the form here specifically disclosed the bushing slot 50 also opens onto and extends outwardly from the inner edge 42 of the bushing.

Figure 3:
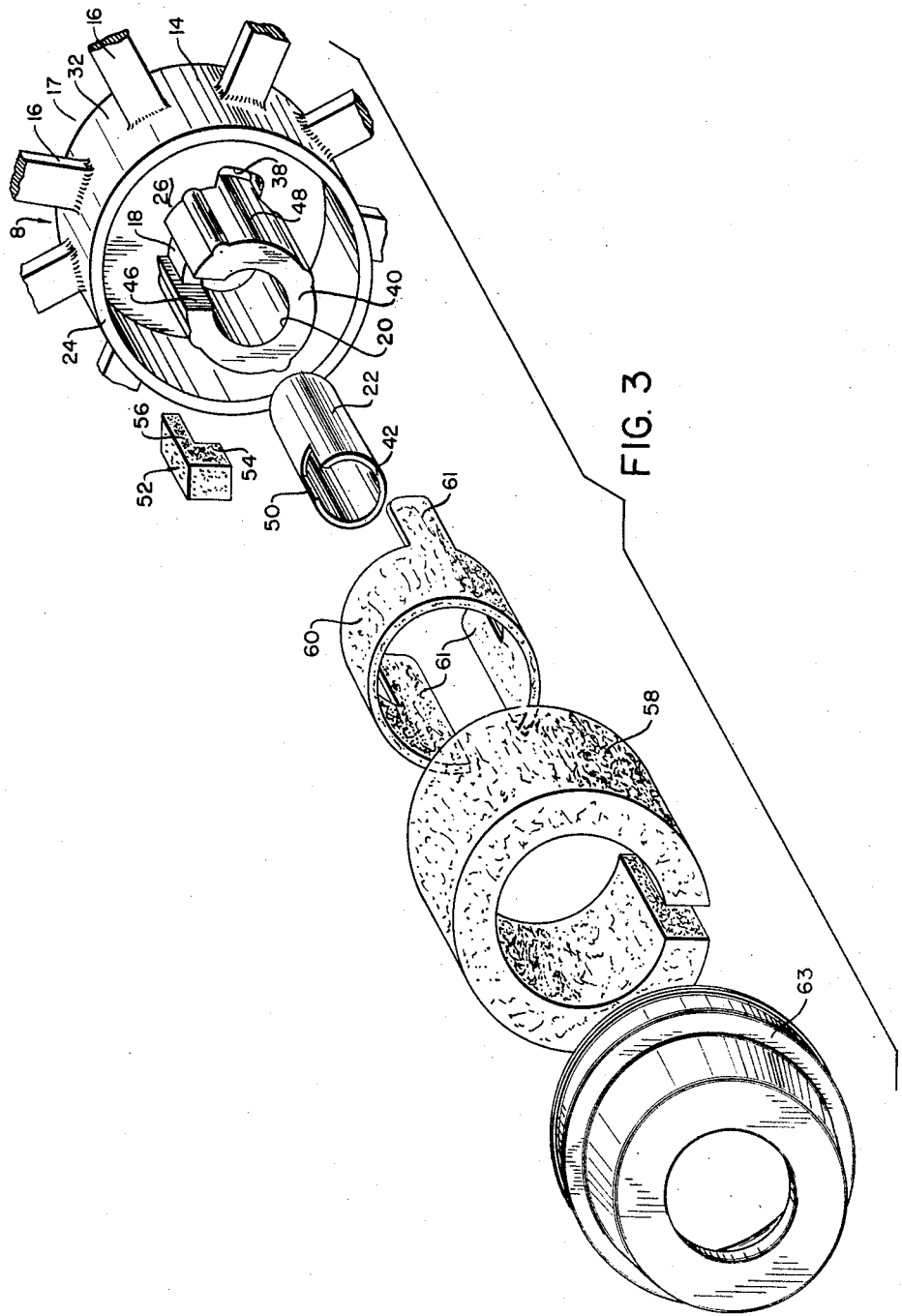
Fig. 3 is a three-quarter perspective exploded view of that portion of the motor end plate shown in Fig. 2, together with the bearing parts.

The slots 46 and 50 contain absorbent material capable of acting in a wick-like manner so as to bring lubricating fluid to its outer surfaces. This absorbent material extends inwardly to the thrust bearing surface 40 of the hub 18 and also preferably extends to the radially inner surface of the hub 18 and of the bushing 22. As here disclosed this absorbent material is constituted by an L-shaped self-sustaining mass 52 of comparatively dense felt or the like, the leg 54 thereof substantially filling the slots 46 and 50 and the leg 56 thereof being received within and substantially filling the slot 48. This mass 52 may readily be put into place merely by sliding it from left to right as viewed in Fig. 3.

The space 26 is preferably substantially completely filled with absorbent material, which may be considerably less dense than the material of which the unit 52 is formed since the function of the absorbent material in the space 26 is primarily to hold a large amount of lubricating fluid. As is conventional, the absorbent material may be constituted by a strip 58 of felt or the like bent to fit within, and preferably to substantially fill, the space 26. As specifically disclosed the strip 58 projects axially inwardly from the space 26 in order to provide for storing a large volume of lubricating fluid, and an internal oil catcher 63 is mounted on the wall 24 and holds the felt strip 58 in place.

Since the absorbent unit 52 should obtain lubricating fluid from the absorbent material 58, it is desirable that the two be in operative engagement. Moreover, some means must be provided for ensuring that the leg 54 be pressed into operative engagement with the shaft 4. To this end a felt strip 60 is interposed between the absorbent material 58 and the absorbent unit 52, the strip 60 being of comparatively dense absorbent material. Lubricating fluid will pass through the strip 60 from the absorbent material 58 to the absorbent unit 52, and at the same time the denseness of the strip 60 ensures the application of a uniform pressure on the unit 52 and permits the springiness of the softer absorbent material 58 to hold the leg 54 of the unit 52 in contact with the shaft 4. The strip 60 is provided with tabs 61 which pass through the passages 38 into the space 36.

A supply of lubricating fluid is fed to the absorbent material 58 in the space 26 through the passage 28, after which that passage is closed by the screw 30, the screw 30 being removed whenever desired in order to replenish the supply of lubricating fluid in the space 26. The absorbent unit 52 draws lubricating fluid from the absorbent ring 58, either directly or through the intermediation of the strip 60, and, because of its wick-like action, conveys the lubricating fluid to its outer surfaces and particularly to its surfaces flush with the hub thrust bearing surface 40 and the radially inner surface of the bearing bushing 22. As the shaft 4 rotates it wipes over the radial inner surface of the leg 54 of the absorbent unit 52, picks up lubricating fluid, and thus ensures the constant presence of a film of lubricating fluid between the outer surface of the shaft 4 and the inner surface of the rotary bearing. If desired, and as is conventional, the bushing 22 may be provided with one or more grooves along the interior surface thereof so as to ensure adequate distribution of lubricating fluid over its entire axial length. Any fluid which may escape beyond the axial outer end of the bushing 22 will collect in the space 36 and will flow back into the space 26 via the passages 38.

Whenever the shaft 4 should move to the right to an extent sufficient to bring the axial outer shaft carried washer 44 into engagement with the inner hub surface 40, that washer 44 will wipe over the axial inner end of the leg 54 of the absorbent unit 52, will draw lubricating fluid therefrom, and thus will positively ensure the presence of an adequate film of lubricating fluid between the thrust bearing surfaces defined on the one hand by the axially outer surface of the washer 44 and on the other hand by the axially inner surface 40 of the hub 18 and, in the form here specifically disclosed, also by the axially inner surface 42 of the bushing 22. The shaft may also carry an oil "slinger" 62 so that any lubricating fluid which may tend to escape axially inwardly beyond the washers 44 will be returned to the absorbent material.

The function of the tabs 61 which extend into the space 26 is to act as wicks, causing lubricating fluid which might collect within the space 26 after escaping from the axial outer end of the rotary bearing to be drawn back into the space 26 and returned to the bearing surfaces by the various absorbent elements previously described. This feature is particularly important, since it permits the motor to be operated in any position, even with the shaft for vertical and the space 36 pointed down, without any loss in effective bearing lubrication, and this without having to employ grooves in the shaft journals.

It will thus be seen that the construction of the present invention provides for positive lubrication of the thrust bearing interface in an extremely simple manner and without detracting from adequate lubrication of the rotary bearing interface. Because of this positive thrust bearing interface lubrication, it is feasible to constitute the fixed thrust bearing surface either wholly or in major part of conventional structural material and not necessarily of special bearing material although, of course, the present invention is not limited to this feature. In addition, the accurate dimensioning and positioning of the fixed thrust bearing surface is greatly facilitated from a production point of view. Not only are fewer parts employed in the construction of the present invention as compared to prior art structures, this in itself being quite significant both from the point of view of saving material cost and saving in production cost, but eminently superior thrust bearing lubrication is achieved when compared with the more elaborate and expensive prior art schemes.

While but a single embodiment of the present invention has been here disclosed, it will be apparent that many variations may be made therein, all within the scope of the present invention as defined in the following claims.

We claim:

1. A shaft bearing assembly comprising a support, a hub on the inner surface thereof and having a shaft-receiving opening, a chamber being defined between said support and said hub, said hub having an aperture communicating between said chamber and the radially inner surface of said hub at the axially inner end of said hub, a body of absorbent material comprising two angularly related legs, one leg extending within said chamber over the radially outer surface of said hub and the other leg extending through said aperture to the radially inner surface of said hub and also extending to the axially inner end of said hub, a ring of absorbent material in said chamber substantially surrounding said hub and engaging the radially outer surface of said one leg of said absorbent body over substantially all of its radially exposed surface, and a mass of absorbent material in said chamber and substantially surrounding said absorbent ring and engaging the radially outer surface thereof.

2. The shaft bearing assembly of claim 1, in which said absorbent body and said absorbent ring are denser than said absorbent mass.

3. The shaft bearing assembly of claim 2, in which the radially outer surface of said hub is provided with a slot extending only partway radially therethrough and communicating with said aperture, said one leg of said absorbent body being received within said slot.

4. The shaft bearing assembly of claim 1, in which the radially outer surface of said hub is provided with a slot extending only partway radially therethrough and communicating with said aperture, said one leg of said absorbent body being substantially completely received within said slot.

5. The shaft bearing assembly of claim 1, in which said support comprises an axially outwardly located wall having an aperture, said shaft-receiving opening passing through said wall, said ring having a tab which passes through said aperture and extends axially outwardly beyond said wall.

6. The shaft bearing assembly of claim 5, in which the radially outer surface of said hub is provided with a slot extending only partway radially therethrough and communicating with said aperture, said one leg of said absorbent body being substantially completely received within said slot.

7. The shaft bearing assembly of claim 5, in which said absorbent body and said absorbent ring are denser than said absorbent mass.

8. The shaft bearing assembly of claim 5, in which the radially outer surface of said hub is provided with a slot extending only partway radially therethrough and communicating with said aperture, said one leg of said absorbent body being substantially completely received within said slot, and in which said absorbent body and said absorbent ring are denser than said absorbent mass.

9. A shaft bearing assembly comprising a support, a hub on the inner surface thereof and having a shaft-receiving opening, a chamber being defined between said support and said hub, said hub having an aperture communicating between said chamber and the radially inner surface of said hub, a body of absorbent material comprising two angularly related legs, one leg extending within said chamber over the radially outer surface of said hub and the other leg extending through said aperture to the radially inner surface of said hub, a ring of absorbent material in said chamber substantially surrounding said hub and engaging the radially outer surface of said one leg of said absorbent body, and a mass of absorbent material in said chamber and substantially surrounding said absorbent ring and engaging the radially outer surface thereof, said absorbent body and said absorbent ring being denser than said absorbent mass.

10. The shaft bearing assembly of claim 9, in which the radially outer surface of said hub is provided with a slot extending only partway radially therethrough and communicating with said aperture, said one leg of said absorbent body being received within said slot.

References Cited in the file of this patent

UNITED STATES PATENTS

| | | |
|---|---|---|
| 980,579 | Wigglesworth | Jan. 3, 1911 |
| 1,573,008 | MacLean | Feb. 16, 1926 |
| 2,175,887 | Fleischer | Oct. 10, 1939 |
| 2,503,021 | Bennett | Apr. 4, 1950 |
| 2,685,658 | Feiertag | Aug. 3, 1954 |

FOREIGN PATENTS

| | | |
|---|---|---|
| 403,561 | Great Britain | Dec. 28, 1933 |
| 81,606 | Sweden | Oct. 2, 1934 |